US011972367B2

(12) United States Patent
Mietke et al.

(10) Patent No.: US 11,972,367 B2
(45) Date of Patent: Apr. 30, 2024

(54) PATTERN RECOGNITION TO DETECT ERRONEOUS DATA

(71) Applicant: SAP SE, Walldorf (DE)

(72) Inventors: Sebastian Mietke, Wiesloch (DE); Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 1050 days.

(21) Appl. No.: 15/646,665

(22) Filed: Jul. 11, 2017

(65) Prior Publication Data
US 2019/0019095 A1 Jan. 17, 2019

(51) Int. Cl.
G06N 5/047 (2023.01)
G06F 16/215 (2019.01)
G06F 16/23 (2019.01)
G06N 20/00 (2019.01)

(52) U.S. Cl.
CPC ........... *G06N 5/047* (2013.01); *G06F 16/215* (2019.01); *G06F 16/2358* (2019.01); *G06F 16/2365* (2019.01); *G06N 20/00* (2019.01)

(58) Field of Classification Search
CPC .. G06F 11/3466; G06F 11/36; G06F 11/3604; G06F 16/215; G06F 16/2358; G06F 16/2365; G06N 20/00; G06N 5/025; G06N 5/047
See application file for complete search history.

(56) References Cited

U.S. PATENT DOCUMENTS 7,810,071 B2 10/2010 Thebes et al.
7,996,723 B2 8/2011 Levine et al.
8,166,459 B2 4/2012 Suenbuel
8,181,163 B2 5/2012 Jojic et al.
9,519,477 B2 12/2016 Champlin-Scharff et al.
(Continued)

FOREIGN PATENT DOCUMENTS

CN 102622510 A 8/2012

OTHER PUBLICATIONS

Bekli et al. ("Assuring Data Quality by Placing the User in the Loop", 2016 International Conference on Computational Science and Computational Intelligence, 2016, pp. 468-471) (Year: 2016).*
(Continued)

*Primary Examiner* — Vincent Gonzales
(74) *Attorney, Agent, or Firm* — Sterne, Kessler, Goldstein & Fox P.L.L.C.

(57) ABSTRACT

Disclosed herein are system, method, and computer program product embodiments for detecting erroneous data. In an embodiment, a data monitoring system may store an initial dataset. The data monitoring system may analyze the initial dataset to generate rules associated with the initial dataset. The data monitoring system may receive a new data entry from a client device intended to be associated with the initial dataset. The data monitoring system may compare the new data entry to the previously determined rules to determine if the new data entry complies. If so, the data monitoring system may store the new data entry. If not, the data monitoring system may generate an alert, requesting a confirmation that the noncompliant data entry is correct. If the noncompliant data is confirmed as correct, the data monitoring system may store the new data entry and update the rules associated with the updated dataset.

26 Claims, 4 Drawing Sheets

(56) References Cited

U.S. PATENT DOCUMENTS

| | | | |
|---|---|---|---|
| 2008/0140602 A1* | 6/2008 | Roth | G06F 16/215 |
| | | | 706/59 |
| 2014/0222722 A1* | 8/2014 | Varma | G06N 20/00 |
| | | | 706/12 |
| 2015/0261824 A1* | 9/2015 | Jha | G06F 16/951 |
| | | | 707/690 |
| 2016/0246838 A1* | 8/2016 | Li | G06F 11/3684 |
| 2016/0379139 A1* | 12/2016 | Eldar | G06F 16/35 |
| | | | 706/12 |

OTHER PUBLICATIONS

Leung et al. ("Insights into Regression Testing", Proceedings. Conference on Software Maintenance, 1989, pp. 60-69) (Year: 1989).*

Boya Sun ("Precision Improvement and Cost Reduction for Defect Mining and Testing", PHD Dissertation, Department of Electrical Engineering and Computer Science, Case Western Reserve University, Jan. 2012, pp. 1-175) (Year: 2012).*

Muslu et al. ("Preventing Data Errors with Continuous Testing", ISSTA' 15, Jul. 13-17, 2015, pp. 373-384) (Year: 2015).*

Bekri et al. ("Assuring Data Quality by Placing the User in the Loop", 2016 International Conference on Computational Science and Computational Intelligence, 2016, pp. 468-471) (Year: 2016).*

Kaur et al. ("Defect Prediction by Pruning Redundancy in Association Rule Mining", International Journal of Advanced Research in Computer Science, vol. 8, No. 5, May-Jun. 2017, pp. 2182-2186) (Year: 2017).*

Zheng et al. ("Test Selection for Result Inspection via Mining Predicate Rules", ICSE'09, 2009, pp. 219-222) (Year: 2009).*

English-language abstract of Chinese Patent Application Publication No. 102622510 A, published Aug. 1, 2012; 1 page.

* cited by examiner

PATTERN RECOGNITION TO DETECT ERRONEOUS DATA

BACKGROUND

Updates to software rarely yield perfect results. Minor unforeseen errors may occur, such as coding errors or erroneous result calculations. When software is updated on a customer-basis, not all customer scenarios may be tested. These unforeseen and untested scenarios often result in software that may be incompatible with real-world cases. For example, while compiling updated software may not lead to a coding error, erroneous rules and/or algorithms may yield erroneous calculations.

When given a certain input, the software may generate an erroneous output based on the calculation. Devices utilizing this data may not detect that the data is erroneous data and may unintentionally store the erroneous data. In a similar manner, manually entered data into a database or memory repository may also be prone to user-created errors. Allowing these errors to persist or unknowingly relying on stored erroneous data may result in unpredictable results, computer errors, and/or human errors related to reliance on the erroneous data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
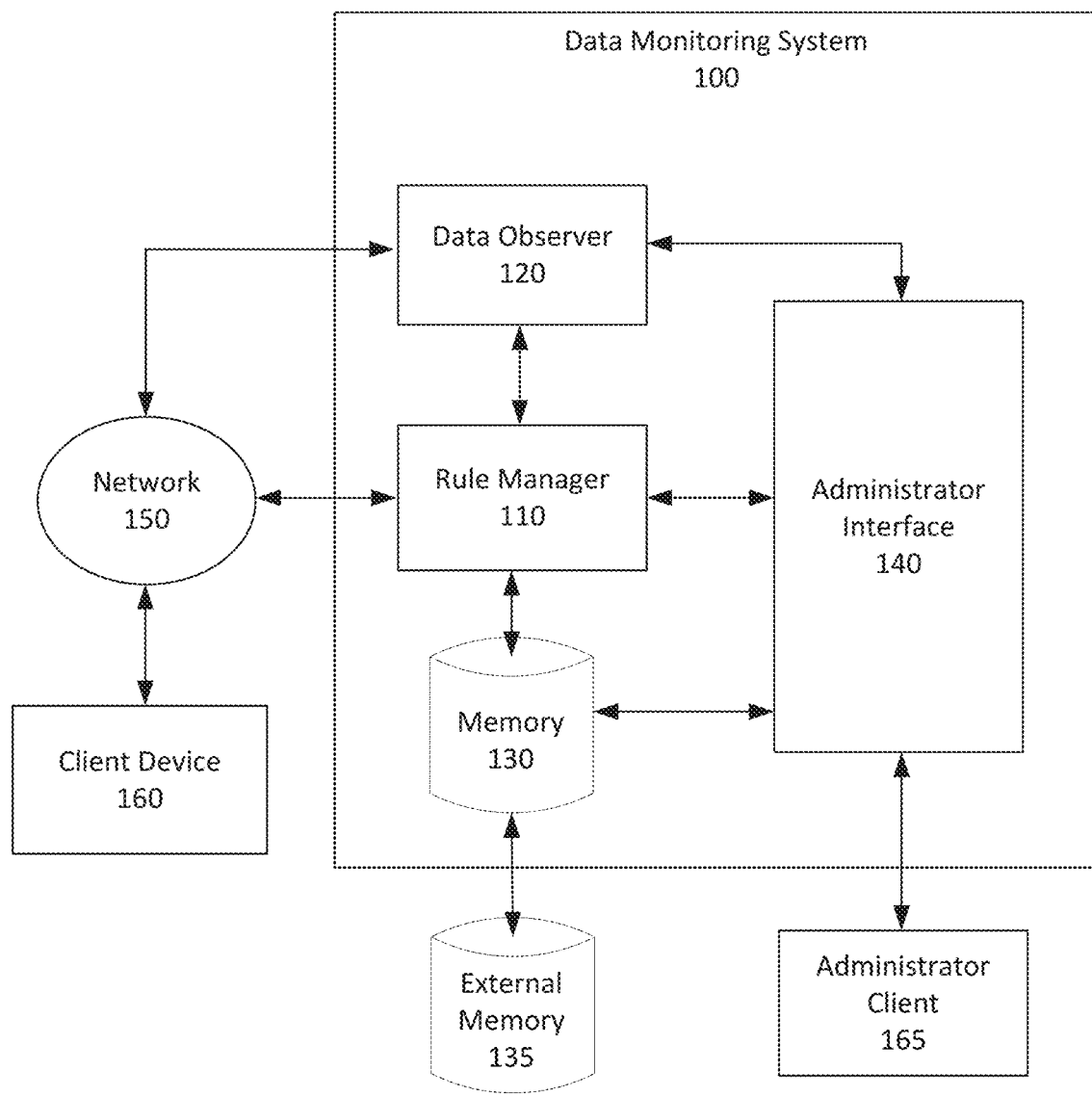
FIG. 1 is a block diagram of a data monitoring system, according to some embodiments.

Provided herein are system, apparatus, device, method and/or computer program product embodiments, and/or combinations and sub-combinations thereof, for semi-automatic learning to detect erroneous data.

In an embodiment, a data monitoring system may monitor results generated from software calculations and/or data submitted by a user. This monitoring may identify errors and/or inconsistencies prior to storing erroneous calculated results and/or submitted data. By actively identifying these errors, the data monitoring system may correct the errors as they are submitted. This error correction may prevent the storage and the potential future reliance on erroneous data.

To identify erroneous data, the data monitoring system may utilize a rule manager. The rule manager may comprise one or more processors configured to manage data rules and/or identify patterns of data. Identifying data patterns may allow the rule manager to develop new rules related to a stored dataset. In an embodiment, the data monitoring system may include a memory configured to store data that has been identified as correct or that satisfies the rules established by the rule manager. The data monitoring system may also include a data observer configured to receive data from a client device via a network. In an embodiment, the rule manager may apply rules to the data received at the data observer to determine if an inconsistency exists. If received data is not inconsistent with the rules established for the existing dataset, the rule manager may store the received data in the memory.

In an embodiment, if the received data is inconsistent with a rule, the rule manager may generate an inconsistency alert, signaling that the data monitoring system has received inconsistent data. The rule manager may transmit this alert to the client device providing the received data. In an embodiment, the rule manager may allow the client device to confirm that the received data was correctly submitted and/or submit new data if the originally submitted data was erroneous.

In an embodiment, the rule manager may utilize an administrator interface to transmit the alert to an administrator client. The administrator client may allow an individual with rule-making authority to approve the received data and/or specify new rules for the dataset. In an embodiment, the administrator client may be a device separate from the data monitoring system. In an embodiment, the administrator client may be hardware associated with the data monitoring system.

In an embodiment, by monitoring received data and determining whether the received data conforms with pre-established rules, the data monitoring system may allow for automatic redundancy with regard to identifying erroneous data. In an embodiment, to further automate this process, the data monitor system may also utilize machine learning and/or artificial intelligence to identify data patterns and/or determine new rules. For example, the rule manager may analyze a dataset stored in the memory to determine patterns associated with the dataset. The patterns may be statistically calculated and or deterministically identified. These patterns may form the basis of a rule. In an embodiment, the rule manager may rank different patterns related to the dataset. For example, the rule manager may rank the patterns based on a percentage of data that complies with the pattern. A pattern with a higher percentage of data from the dataset that complies may be ranked higher and may be more desirable than a pattern with a lower percentage of data. For example, a pattern where 95% of the data entries of the dataset comply is ranked higher than a pattern where 90% of the data entries of the dataset comply. In an embodiment, an administrator may define a compliance threshold, specifying a percentage of matching data that must comply with the pattern in order for the rule manager to associate the pattern with the dataset. For example, to be defined as a pattern, 95% of the data entries may be required to comply with the pattern. Additionally, the rule manager may define a complexity threshold related to the number of pattern elements. In an embodiment, the complexity threshold may limit the number of pattern elements and/or exceptions to a core pattern so that the rule manager does not calculate a single lengthy and/or complicated pattern to define the entire dataset.

The rule manager may aggregate one or more rules associated with a dataset stored in the memory. In an embodiment, each datum of the dataset may comply with the rule. The rule manager may define the rules such that each datum complies. In an embodiment, when the data observer receives a new datum, the rule manager may determine if the new datum complies with the established rules. If so, the rule manager may store the new datum. If the new datum does not comply, but an administrator and/or client device has confirmed that the new datum is correct and/or should be entered, the rule manager may determine new rules associated with the dataset stored in the memory with the new datum. In an embodiment, the rule manager may generate one or more new rules such that the all data stored in the memory, including the new datum, comply with the one or more new rules. The rule manager may generate these new rules in a statistical and/or deterministic manner. This embodiment may allow the rule manager to automatically generate rules related to the dataset and/or update the rules as new information is received. This updating may allow the data monitoring system to "learn" in a semi-automatic manner. By also confirming that the new information is correct and/or acceptable, the rule manager may reduce the amount of stored erroneous data. In an embodiment, if the rules become established and designated as unchangeable, the data monitoring system may be able to identify correct data and/or reject erroneous data.

In an embodiment, the data monitoring system may store an initial dataset comprising data. The data monitoring system may store the initial dataset on behalf of a client device. For example, the data monitoring system may receive the initial dataset from the client device via a network. The data monitoring system may receive the initial dataset at a data observer. The rule manager may determine patterns and/or rules associated with the initial dataset.

The client device may undergo a software update, potentially changing algorithms and/or procedures associated with the client device. In response, the client device may send an updated dataset corresponding to the already stored dataset. In an embodiment, the data monitoring system may detect that the client device has executed a software update and may prompt the client device to transmit a new dataset. The data monitoring system may receive a post-update dataset from the client device. In an embodiment, the post-update dataset may include the results generated from applying the updated software to input data at the client device.

When the data monitoring system receives the post-update dataset, the rule manager may compare the post-update dataset with the stored initial dataset. If the post-update dataset is the same as the stored initial dataset, the rule manager may determine if the rules for the dataset have been set via an analysis of the data in the initial dataset. If the rule manager has already associated rules with the dataset, the rule manager may continue to utilize the same rules. In an embodiment, using the same rules may indicate that the software update has not changed the calculation of data and that the data monitoring system detects no discrepancies and/or errors between the initial dataset and the post-update dataset. In an embodiment, if the post-update dataset matches the initial dataset but the rules have not been generated, the rule manager may analyze the post-update dataset and/or the initial dataset to generate the rules to associate with the updated dataset. The data monitoring system may utilize these rules in future applications of newer software updates and/or of new datum received.

In an embodiment, if the post-update dataset differs from the stored initial dataset, the data monitoring system may detect an error and/or discrepancy. This inconsistency may represent a bug and/or problem with the software update applied to the client device. The data monitoring system may confirm that the updated dataset is correct. In an embodiment, the data monitoring system may generate an alert. The data monitoring system may transmit the alert to the client device providing the post-update dataset and/or may transmit the alert to an administrator with dataset management authorization.

In an embodiment, if the client device and/or administrator confirms that the post-update dataset is correct, the data monitoring system may analyze the post-update dataset and generate new rules based patterns associated with the post-update dataset. In an embodiment, if the client device and/or administrator client indicates that the post-update dataset is incorrect and/or contains errors, the data monitoring system may request a new dataset from the client device. In an embodiment, the software associated with the client device may need to be changed before receiving the new dataset. This function may alert administrators and/or developers to any inconsistencies that may arise regarding software updates, allowing the administrators and/or to troubleshoot test cases that existed and were deemed correct prior to the software update. In an embodiment, the client device may supply a fixed version of the post-update dataset. Similar to the above-described algorithm, this fixed version may be checked to determine if the fixed version is the same as the stored initial dataset. If so, the fixed version may be stored. If not, the data monitoring system may prompt the client device to confirm that the fixed version represents the correct version. If so, the data monitoring system may analyze the fixed version and generate new rules based on the fixed version. If not, the data monitoring system may once again request a new dataset.

In an embodiment, the above-mentioned procedures may be executed comparing a portion of the stored initial dataset to a portion of the post-update dataset and/or a portion of the fixed version dataset.

In an embodiment, the data monitoring system may operate in a similar manner regarding individual datum received from a client device. For example, a user may utilize the client device as a data entry tool, adding new data to a dataset and/or updating a dataset stored in the data monitoring system with new entries. The data monitoring system may receive the new input data. The data monitoring may determine if the new input data complies with already established rules regarding the stored initial dataset. If the new input data complies with the already established rules, the data monitoring system may store the new input data, associating the new input data with the store initial dataset. This storage may indicate that no discrepancies exist between the new input data and the stored initial dataset.

In an embodiment, the data monitoring system may determine that the new input data does not comply with the already established rules regarding the stored initial dataset. In response, the data monitoring system may generate a noncompliance alert. The noncompliance alert may be a message to the client device providing the new input data and/or a message to an administrator. The noncompliance alert may request a response from the client device and/or administrator indicating whether the new input data is correct. If the data monitoring system receives an indication that the new input data is correct, the data monitoring system may store the new input data in memory and/or associate the new input data with the stored initial dataset. This indication may be a confirmation message and/or an override message received from the client device and/or administrator. Based on the new input data and the stored initial dataset, the data monitoring system may determine new rules based on new patterns associated with the updated dataset. In an embodiment, the data monitoring system may receive new rules in response to the noncompliance alert. The new rules may indicate that the new input data is correct.

In an embodiment, the data monitoring system may receive an indication that the new input data is incorrect and/or erroneous, the data monitoring system may prompt the client device and/or administrator for corrected input data. In response to receiving corrected input data, the data monitoring system may again check if the corrected input data complies with the already established rules. If so, the data monitoring system may store the corrected input data. If not, the data monitoring system may generate another noncompliance alert. If the corrected input data is confirmed to be correct, the data monitoring system may store the corrected input data and/or generate new rules based on the corrected input data. If the corrected input data is not correct, the data monitoring system may receive a second version of the corrected input data. The data monitoring system may perform similar actions to the second version of the corrected input data, and/or to other versions, until a correct version of the input data is confirmed. This iterative process may allow for errors in data entry to be determined before storing potentially erroneous data.

These features will now be discussed with respect to the corresponding figures.

FIG. 1 is a block diagram of a data monitoring system 100, according to some embodiments. In an embodiment, data monitoring system 100 may store data, check dataset compliance resulting from a software update, and/or monitor input data. Checking dataset compliance and/or monitoring input data may allow data monitoring system 100 to identify errors related to software updates or input data prior to storage. This identification may prevent the storage of erroneous data and/or future reliance on erroneously stored data.

In an embodiment, data monitoring system 100 may include rule manager 110, data observer 120, memory 130, and/or administrator interface 140. Rule manager 110 may comprise one or more processors, buffers, servers, routers, modems, antennae, and/or circuitry configured to interface with data observer 120, memory 130, administrator interface 140, and/or network 150. Data observer 120 may comprise one or more processors, buffers, servers, routers, modems, antennae, and/or circuitry configured to interface with rule manager 110, memory 130, administrator interface 140, and/or network 150. Network 150 may be a network capable of transmitting information either in a wired or wireless manner and may be, for example, the Internet, a Local Area Network, or a Wide Area Network. Network 150 may utilize a network protocol, such as, for example, a hypertext transfer protocol (HTTP), a TCP/IP protocol, Ethernet, or an asynchronous transfer mode.

In an embodiment, rule manager 110 and/or data observer 120 may utilize network 150 to communicate with client device 160. Client device 160 may be a computing platform, such as but not limited to smartphones, tablet computers, laptop computers, desktop computers, web browsers, and/or other computing devices, apparatuses, systems, or platforms. Data observer 120 may receive data from client device 160 via network 150. In an embodiment, if rule manager 110 is processing data, data observer 120 may buffer data received in a local memory repository. In an embodiment, data observer 120 may comprise the same hardware and/or may share hardware. In an embodiment, client device 160 may not be a device separate from data monitoring system 100. In an embodiment client device 160 may share hardware with data monitoring system 100. For example, client device 160 may internalize data monitoring system 100 to monitor data processed within client device 160.

Rule manager 110 may be configured to receive data from data observer 120. Rule manager 110 may apply rules to the received data to determine if the received data complies with the rules generated for data stored in memory 130. Memory 130 may include volatile memory, such as random access memory (RAM), a non-volatile memory, such as a flash memory, and/or a battery backed up RAM, one or more processor registers, or other suitable mechanism for storing data.

In an embodiment, memory 130 may store an initial dataset. Rule manager 110 may analyze the dataset to determine patterns and/or rules associated with the initial dataset stored in memory 130. An example of this pattern recognition and/or analysis is further described with reference to FIG. 3. Data observer 120 may then receive new data from client device 160 via network 150. In an embodiment, the new data received may be data entered by client device 160. For example, a user may manually enter data using client device 160, desiring to store the entered data in memory 130 and/or associate the entered data with the initial dataset. In an embodiment, the new data may be generated as a result of a software update applied to client device 160.

When data observer 120 receives the new data, data observer 120 may transmit the data to rule manager 110. Based on the rules determined regarding the data stored in memory 130, rule manager 110 may determine whether to store the new data, associating the new data with the initial dataset, and/or reject the new data.

In an embodiment, if rule manager 110 determines that the new data complies with the rules determined regarding the data stored in memory 130, rule manager 110 may store the new data in memory 130.

If rule manager 110 determines that the new data does not comply with the rules, rule manager 110 may generate a noncompliance alert. Rule manager 110 may transmit this noncompliance alert to client device 160 via network 150 and/or to administrator interface 140. Administrator interface 140 may include one or more processors, buffers, servers, routers, modems, antennae, and/or circuitry configured to interface with rule manager 110, data observer 120, memory 130, and/or administrator client 165. Administrator client 165 may be a computing platform, such as but not limited to smartphones, tablet computers, laptop computers, desktop computers, web browsers, and/or other computing devices, apparatuses, systems, or platforms. In an embodiment, administrator client 165 may be a component of data monitoring system 100 and/or may share hardware with data monitoring system 100. Administrator client 165 may be a device allowing an administrator to interact with data monitoring system 100. An administrator may be a decision-maker capable of determining whether input data is correct and/or whether to modify the rules applied by rule manager 110.

To interface with administrator client 165, administrator interface 140 may utilize network 150. Administrator interface 140 may transmit noncompliance alerts to administrator client 165. Administrator interface 140 may allow administrator client 165 to monitor data stored in memory 130 and/or rules managed by rule manager 110. For example, if rule manager 110 generates a noncompliance alert and transmits the alert to administrator client 165, administrator client 165 may respond, transmitting an acknowledgment of the noncompliance alert.

In an embodiment, administrator interface 140 may receive a message from administrator client 165 indicating that the new data is correct. In response, rule manager 110 may store the new data in memory 130 and/or generate new rules based on the addition of the new data to the initial dataset. In an embodiment, administrator interface 140 may receive a message from administrator client 165 indicating that the new data is incorrect. Administrator interface 140 may receive corrected new data from administrator client 165. Based on this corrected data, rule manager 110 may determine if the corrected data complies with the previous rules and/or if the previous rules should be updated to include the corrected data.

In an embodiment, client device 160 may operate in a manner similar to administrator client 165. Rule manager 110 may communicate with client device 160 to determine if any corrections are needed in response to determining that the new data does not comply with the rules.

In an embodiment, data monitoring system 100 may interface with external memory 135. External memory 135 may include a database and/or distributed memory cluster remote from data monitoring system 100. External memory 135 may be an extension of memory 130. In an embodiment, memory 130 may act as a buffer while external memory 135 may be a repository of data that has been deemed correct. In an embodiment, rule manager 110 may store data that client device 160 and/or administrator client 165 has deemed correct in external memory 135. Before confirmation and/or if rule manager 110 notes a discrepancy between the new data and the established rules, memory 130 may act as a temporary storage until the new data is confirmed. Once confirmed, data monitoring system 100 may store the new data in external memory 135 and/or associate the new data with an initial dataset stored in external memory 135. In an embodiment data monitoring system 100 may act as an intermediary for monitoring data while not acting as the repository for data storage.

In an embodiment, data monitoring system 100 may act as the repository for data storage. Memory 130 may be a repository for data that has been deemed correct. In an embodiment, data monitoring system 100 may not utilize external memory 135.

Figure 2:
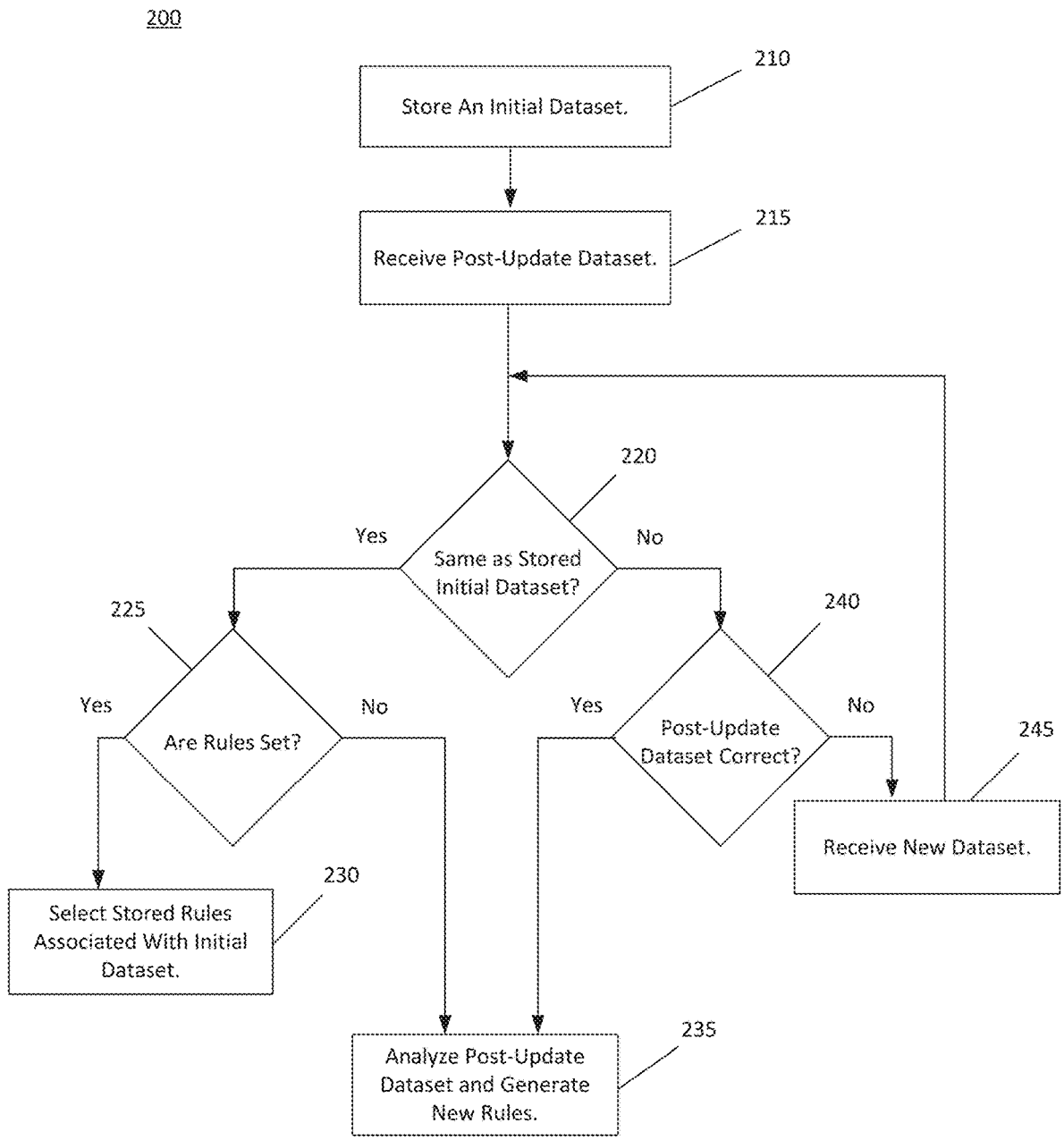
FIG. 2 is a flowchart illustrating a method for testing updated software results, according to some embodiments.

FIG. 2 is a flowchart illustrating a method 200 for testing updated software results, according to some embodiments. Method 200 shall be described with reference to FIG. 1. However, method 200 is not limited to that example embodiment.

Data monitoring system 100 and/or rule manager 110 may utilize method 200 to test results generated from a software update. In an embodiment, method 200 may aid in determining with a software update has generated erroneous data. In an embodiment, rule manager 110 may store an initial dataset. The initial dataset may be generated from client device 160. Client device 160 may receive a software update. Utilizing method 200, rule manager 110 may determine if the software update has caused client device 160 to generate results inconsistent with the stored initial dataset. In an embodiment, the stored initial dataset may represent a "correct" and/or desired result of the software executed on client device 160. The foregoing description will describe an embodiment of the execution of method 200 with respect to rule manager 110.

While method 200 may be described with reference to rule manager 110, method 200 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 210, rule manager 110 may store an initial dataset. In an embodiment, rule manager 110 may store the initial dataset in memory 130 and/or external memory 135. Client device 160 and/or administrator 165 may have initialized the initial dataset, providing rule manager 110 with a correct dataset and/or a dataset with verified data. In an embodiment, the initial dataset may act as a baseline to which rule manager 110 may compare new datasets. Based on comparisons with the initial dataset, rule manager 110 may determine that an inconsistency occurs. In an embodiment, rule manager 110 may also analyze the initial dataset and store patterns and/or rules associated with the dataset. This analysis is further described with reference to FIG. 3. Using these patterns and/or rules, rule manager 110 may determine if discrepancies occur based on new datasets received.

At 215, rule manager 110 may receive a post-update dataset. In an embodiment, rule manager 110 may receive the post-update dataset from client device 160. Rule manager 110 may receive the post-update dataset via network 150. The post-update dataset may be a dataset generated by client device 160 after client device 160 receives a software update. In an embodiment, rule manager 110 may receive the post-update dataset to determine if the software update has caused client device 160 to generate results inconsistent with the initial dataset. If so, rule manager 110 may alert client device 160 and/or administrator client 165 to indicate a potential issue regarding the software update. In an embodiment, a portion of the post-update dataset may be received rather than a full post-update dataset.

In an embodiment, the post-update dataset may be a second dataset generated by client device 160 without first undergoing an update. For example, rule manager 110 may periodically receive updated datasets from client device 160 to determine if client device 160 is generating results inconsistent with the initial dataset. Rule manager 110 may, for example, track user manipulations at client device 160 to determine if a user has caused an inconsistency and/or error. In an embodiment, rule manager 110 may request the post-update dataset from client device 160 and/or prompt client device 160 to provide a post-update dataset.

At 220, rule manager 110 may compare the post-update dataset with the initial dataset to determine if the post-update dataset is the same as the initial dataset. Rule manager 110 may retrieve the initial dataset from its storage location in memory 130 and/or external memory 135 to perform the comparison. In an embodiment, to determine that the post-update dataset is the same as the initial dataset, rule manager 110 may compare each data entry and may require each data entry to match. If rule manager 110 discovers a discrepancy, rule manager 110 may record the discrepancy and indicate that the post-update dataset is not the same as the stored initial dataset. If each data entry matches, however, rule manager 110 may indicate that the post-update dataset is the same as the stored initial dataset.

In an embodiment, rule manager 110 may not require that each entry of the post-update dataset match each entry of the stored initial dataset. For example, to determine that the post-update dataset matches the stored initial dataset, rule manager 110 may only need to determine that a portion of the post-update dataset matches a portion of the stored initial dataset.

In an embodiment, the post-update dataset may include more than or fewer than the number of data entries of the initial dataset. In this embodiment, rule manager 110 may indicate that the post-update dataset differs from the stored initial dataset.

At 225, if rule manager 110 determines that the post-update dataset is the same as the stored initial dataset, rule manager 110 may determine whether the rules regarding the stored initial dataset have been set. In an embodiment, at 225, rule manager 110 may determine if rule manager 110 has already analyzed the initial dataset and developed patterns and/or rules associated with the initial dataset. These patterns and/or rules may be stored in memory 130 and/or external memory 135.

If the rules have been set, at 230, rule manager 110 may continue to utilize the rules associated with the initial dataset. Because the post-update dataset may be the same as the stored initial dataset, the post-update dataset may also conform to the rules already established for the initial dataset.

If rule manager 110 has not previously set the rules, at 235, rule manager 110 may analyze the post-update dataset and generate new rules associated with the post-update dataset. In an embodiment, rule manager 110 may optionally analyze the initial dataset when the post-update dataset is the same as the initial dataset. By either selecting stored rules at 230 and/or generating new rules based on the post-update dataset, rule manager 110 may be able to generate a baseline set of one or more rules. Rule manager 110 may utilize this baseline set of one or more rules to determine whether future software updates generate inconsistent results. Rule manager 110 may also utilize this baseline set of one or more rules to determine if new data entries received at rule manager 110 also conform with the baseline set of one or more rules. If the new data entries do not conform with the baseline set of one or more rules, rule manager 110 may note a discrepancy and potentially identify erroneous data before accidentally storing the erroneous data.

In an embodiment, at 235, rule manager 110 may generate new rules using patterns related to the post-update dataset. Rule manager 110 may recognize these patterns by analyzing the post-update dataset using pattern recognition algorithms, machine learning, and/or artificial intelligence. In an embodiment, rule manager 110 may rank different patterns related to the initial dataset and/or the post-update dataset. For example, rule manager 110 may rank the patterns based on a percentage of data entries of the initial and/or post-updated dataset that complies with the pattern. A pattern with a higher percentage of data from the initial and/or post-update dataset that complies may be ranked higher and may be more desirable than a pattern with a lower percentage of data that complies. For example, a pattern where 95% of the data entries of the initial and/or post-update dataset comply is ranked higher than a pattern where 90% of the data entries of the initial and/or post-update dataset comply. In an embodiment, an administrator may define a compliance threshold, specifying a percentage of matching data that must comply with the pattern in order for rule manager 110 to associate the pattern with the initial and/or post-update dataset. For example, to be defined as a pattern, 95% of the data entries of the initial and/or post-update dataset may be required to comply with the pattern. Additionally, rule manager 110 may define a complexity threshold related to the number of pattern elements. In an embodiment, the complexity threshold may limit the number of pattern elements and/or exceptions to a core pattern so that rule manager 110 does not calculate a single lengthy and/or complicated pattern to define the entire dataset.

At 240, if the post-update dataset is not the same as the stored initial dataset, rule manager 110 may request a confirmation that the post-update dataset is correct. For example, rule manager 110 may note discrepancies determined at 220 between the initial dataset and the post-update dataset. Rule manager 110 may then generate a noncompliance alert and/or message indicating that a discrepancy exists. The noncompliance alert and/or message may include the specific instances of discrepancy. Rule manager 110 may transmit the noncompliance alert and/or message to client device 160 and/or administrator client 165. Rule manager 110 may then wait for a response from client device 160 and/or administrator client 165.

In an embodiment, rule manager 110 may receive a confirmation message indicating that the post-update dataset is correct. This confirmation message may be an override message received from the client device and/or administrator. In an embodiment, rule manager 110 may replace the initial dataset in memory 130 and/or external memory 135 with the post-update dataset. In an embodiment, rule manager 110 may store the post-update dataset alongside the initial dataset. At 235, if the post-update dataset is correct, rule manager 110 may analyze the post-update dataset and generate new rules related to the post-update dataset. Rule manager 110 may utilize these rules to determine whether future software updates generate inconsistent results. Rule manager 110 may also utilize these rules to determine if new data entries received at rule manager 110 also conform with the rules. If the new data entries do not conform with the rules, rule manager 110 may note a discrepancy and potentially identify erroneous data before accidentally storing the erroneous data.

In an embodiment, at 240, rule manager 110 may receive a message indicating that the post-update dataset is not correct. In an embodiment, the difference between the post-update dataset and the stored initial dataset may correspond to an error generated as a result of a software update applied to client device 160. In response to receiving a message indicating that the post-update dataset is not correct, rule manager 110 may request a new dataset from client device 160 and/or administrator client 165. Rule manager 110 may receive the new dataset at 245. In an embodiment, in response to transmitting a noncompliance alert and/or message, rule manager 110 may automatically receive a new dataset at 245 without first prompting client device 160 and/or administrator client 165 to provide the new dataset In an embodiment, the software associated with client device 160 may need to be changed before receiving the new dataset. This function may alert administrators and/or developers to any inconsistencies that may arise regarding software updates, allowing the administrators and/or to troubleshoot test cases that existed and were deemed correct prior to the software update. In an embodiment, client device 160 may supply a fixed version of the post-update dataset as the new dataset. Rule manager 110 may receive this fixed version at 245.

Based on the received new dataset and/or the fixed version of the post-update dataset, rule manager 110 may return to 220 to determine if the new dataset and/or the fixed version of the post-update dataset is the same as the stored initial dataset. If so, rule manager 110 may determine if existing rules are set at 225, store the selected rules at 230, analyze new rules based on the fixed version and/or store the fixed version at 235. If not, rule manager 110 may prompt client device 160 and/or administrator client 165 to confirm that the fixed version represents the correct version at 240. If so, rule manager 110 may analyze the fixed version and generate new rules based on the fixed version at 235. If not, rule manager 110 may once again request a new dataset at 240 and/or receive a new dataset at 245.

In an embodiment, rule manager 110 may iterate over method 200 until a received dataset matches the stored initial dataset. In an embodiment, rule manager 110 may iterate over method 200 until client device 160 and/or administrator client 165 confirms that a new and/or post-update dataset is correct and/or desired. In this embodiment, this verification may indicate that even if a software update changes calculations performed and/or results generated at client device 160, an administrator may confirm that these changes are desired. Based on this confirmation, rule manager 110 may also update the rules associated with the confirmed dataset, allowing rule manager 110 to generate new rules and/or continuously recognize patterns associated with a dataset stored in memory 130 and/or external memory 135.

Figure 3:
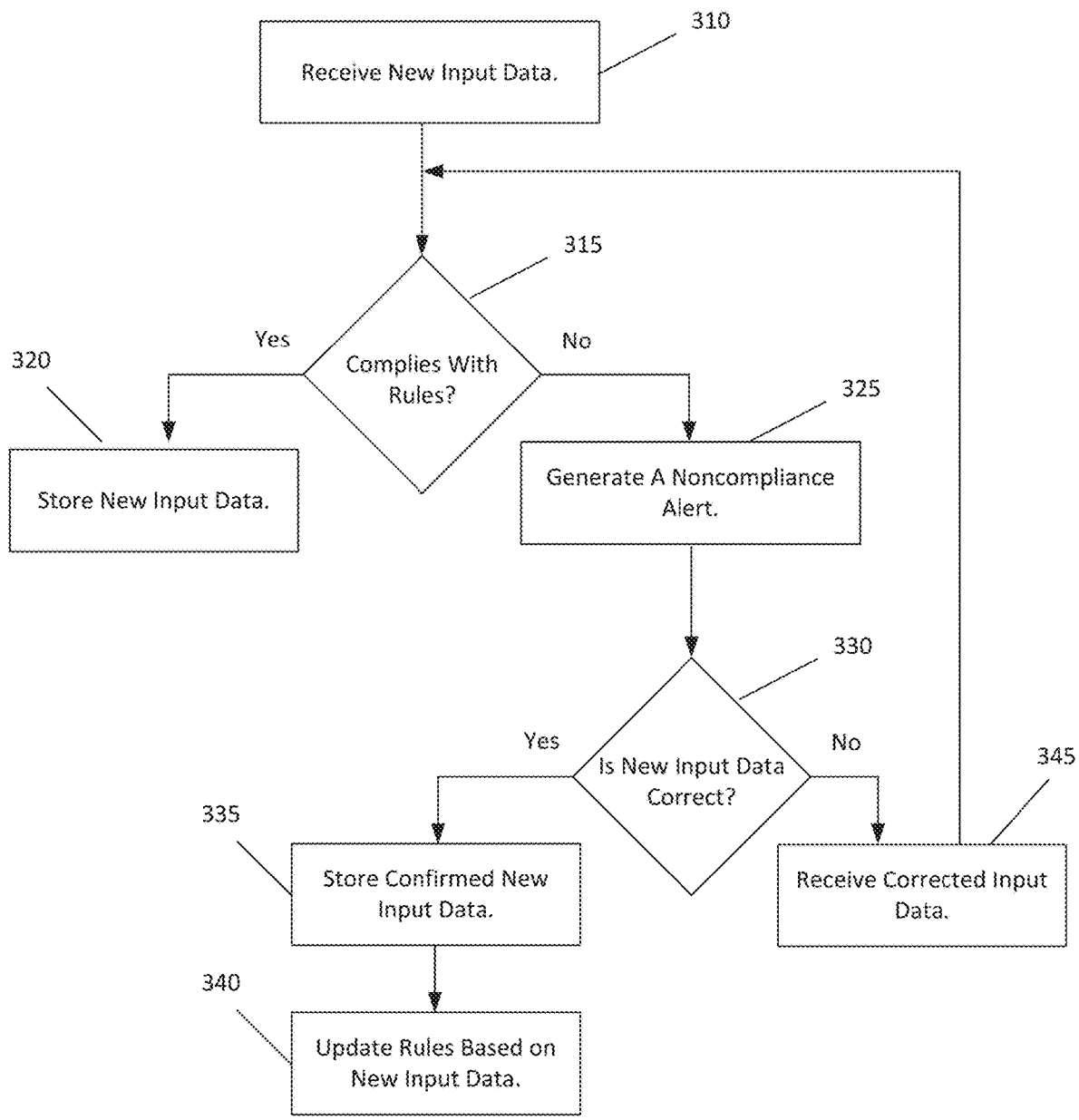
FIG. 3 is a flowchart illustrating a method for monitoring entered data, according to some embodiments.

FIG. 3 is a flowchart illustrating a method 300 for monitoring entered data, according to some embodiments. Method 300 shall be described with reference to FIG. 1. However, method 300 is not limited to that example embodiment.

Data monitoring system 100 and/or rule manager 110 may utilize method 300 to monitor data submitted by client device 160 and determine if an inconsistency exists regarding the submitted data and an initially stored dataset. In an embodiment, method 300 may aid in determining if client device 160 has supplied erroneous data, either due to a software issue and/or a user input error. The foregoing description will describe an embodiment of the execution of method 300 with respect to rule manager 110.

While method 300 may be described with reference to rule manager 110, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 310, rule manager 110 may receive new input data. In an embodiment, rule manager 110 may have already stored an initial dataset in memory 130 and/or external memory 135. Rule manager 110 may have received the initial dataset from client device 160 and/or administrator client 165. In an embodiment, rule manager 110 may have determined patterns and/or rules associated with the initial dataset. When rule manager 110 receives new input data at 310, rule manager may apply the determined rules to the new input data at 315 to determine if the new input data complies with the rules.

To illustrate this concept, in an embodiment, the initial dataset may include a table as depicted in Table 1. Rule manager 110 may store the initial dataset in memory 130 and/or external memory 135. In this example, a BENEFICIARY data field entry may relate to a party intended to receive a payment. A PAYMENT_RECIPIENT data field entry may be a party intended to retrieve the payment on behalf of the BENEFICIARY. A BENEFIT data field entry may signify that the PAYMENT_RECIPIENT differs or is the same as the BENEFICIARY. For example, a "B1" entry in the BENEFICIARY column may signify that the PAYMENT_RECIPIENT is the same as the BENEFICIARY while a "B2" entry in the BENEFICIARY column may signify that the PAYMENT_RECIPIENT differs from the BENEFICIARY.

TABLE 1

| ENTRY | BENEFICIARY | PAYMENT_RECIPIENT | BENEFIT |
|---|---|---|---|
| 1 | Warner | Warner | B1 |
| 2 | Mueller | Mueller | B1 |
| 3 | Thomas | Thomas | B1 |
| 4 | Jack | Jack | B1 |
| 5 | Jack | Thomas | B2 |
| 6 | Thomas | Peter | B2 |
| 7 | Peter | Peter | B1 |

Although Table 1 depicts three columns of related data with seven columns of data entries, the data of the initial dataset may include more columns and/or rows to store more information related to the initial dataset. Based on this initial dataset, rule manager 110 may analyze the initial dataset and determine the pattern of matching BENEFICIARY and PAYMENT_RECIPIENT entries should yield a specific BENEFIT entry. Rule manager 110 may utilize pattern recognition algorithms, machine learning, and/or artificial intelligence to recognize this pattern associated with the initial dataset.

At 310, rule manager 110 may receive new input data, which may be sought to be added to the initial dataset. For example, client device 160 may seek to add new input data by transmitting the new input data to data monitoring system 100. Client device 160 may seek to add Entry 8 as depicted in Table 2.

TABLE 2

| ENTRY | BENEFICIARY | PAYMENT_RECIPIENT | BENEFIT |
|---|---|---|---|
| 1 | Warner | Warner | B1 |
| 2 | Mueller | Mueller | B1 |
| 3 | Thomas | Thomas | B1 |
| 4 | Jack | Jack | B1 |
| 5 | Jack | Thomas | B2 |
| 6 | Thomas | Peter | B2 |
| 7 | Peter | Peter | B1 |
| 8 | Jack | Jack | B1 |

At 315, rule manager 110 may determine whether Entry 8 complies with the previously determined rule. In this embodiment, Entry 8 does comply with the previously determined rule. Because "Jack" in the BENEFICIARY column matches "Jack" in the PAYMENT_RECIPIENT column, rule manager 110 would expect "B1" in the BENEFIT column. Because "B1" is associated with Entry 8, rule manager 110 may determine that Entry 8 complies with the previously established rules. At 320, rule manager 110 may store Entry 8 as the new input data. Rule manager 110 may store the new input data in memory 130, external memory 134, and/or wherever the initial dataset is stored. In an embodiment, rule manager 110 store the new input data without transmitting a notice to client device 160 and/or administrator client 165 indicating compliance with the previously established rules. In this manner, client device 160 and/or administrator client 165 may not be bothered in cases where no discrepancies exist.

In an embodiment, however, the new input data may not comply with the previously determined rule. The embodiment depicted in Table 3 may demonstrate this noncompliance.

TABLE 3

| ENTRY | BENEFICIARY | PAYMENT_RECIPIENT | BENEFIT |
|---|---|---|---|
| 1 | Warner | Warner | B1 |
| 2 | Mueller | Mueller | B1 |
| 3 | Thomas | Thomas | B1 |
| 4 | Jack | Jack | B1 |
| 5 | Jack | Thomas | B2 |
| 6 | Thomas | Peter | B2 |
| 7 | Peter | Peter | B1 |
| 8 | Peter | Jack | B1 |

As seen in Table 3, Entry 8 does not comply with the rule because "Peter" in the BENEFICIARY column/data field differs from "JACK" in the PAYMENT_RECIPIENT column/data field. Although rule manager 110 would expect a "B2" in the BENEFIT column/data field, client device 160 may have submitted a "B1" entry. In this case, rule manager 110 may note that a discrepancy has been detected.

At 325, if rule manager 110 has detected that the new input data does not comply with a previously established rule, rule manager 110 may generate a noncompliance alert. The noncompliance alert may be a message, graphical user interface box, electronic message, and/or other notification indicating that rule manager 110 has discovered a discrepancy with the new input data. In an embodiment, rule manager 110 may transmit the noncompliance alert to client device 160 and/or administrator client 165. In an embodiment, the noncompliance alert may include a request to confirm whether the new input data is correct and/or may a request for corrected input data.

At 330, rule manager 110 may confirm whether the new input data is correct despite noncompliance with previously established rules. For example, rule manager 110 may receive a confirmation that the new input data is correct. This confirmation may be a confirmation message and/or an override message received from the client device and/or administrator indicating that the new input data is correct. In this embodiment, at 335, rule manager 110 may store the confirmed new input data in memory 130 and/or external memory 135. At 335, rule manager 110 may also associate the stored new input data with the initial dataset. In an embodiment, rule manager 110 may generate an updated dataset, which may include the initial dataset and the new input data. At 340, rule manager 110 may update the rules based on the confirmation and/or storage of the new input data. In an embodiment, rule manager 110 may automatically update the rules using other patterns recognized and/or analyzed using pattern recognition algorithms, machine learning, and/or artificial intelligence. In an embodiment, rule manager 110 may rank different patterns related to the updated dataset. For example, rule manager 110 may rank the patterns based on a percentage of data entries of the updated dataset that complies with the pattern. A pattern with a higher percentage of data from the updated dataset that complies may be ranked higher and may be more desirable than a pattern with a lower percentage of data that complies. For example, a pattern where 95% of the data entries of the updated dataset comply is ranked higher than a pattern where 90% of the data entries of the updated dataset comply. In an embodiment, an administrator may define a compliance threshold, specifying a percentage of matching data that must comply with the pattern in order for rule manager 110 to associate the pattern with the dataset. For example, to be defined as a pattern, 95% of the data entries of the updated dataset may be required to comply with the pattern. Additionally, rule manager 110 may define a complexity threshold related to the number of pattern elements. In an embodiment, the complexity threshold may limit the number of pattern elements and/or exceptions to a core pattern so that rule manager 110 does not calculate a single lengthy and/or complicated pattern to define the entire dataset. In an embodiment, client device 160 and/or administrator client 165 may provide new rules to rule manager 110.

In an example embodiment, considering Table 3, Entry 8 may be sought to be added to Entries 1-7, but rule manager 110 may note that Entry 8 does not comply with the previously defined rules. In an embodiment, rule manager 110 may generate a noncompliance alert at 325. Rule manager 110 may transmit the noncompliance alert to client device 160 and/or administrator client 165. At 330, rule manager 110 may receive a confirmation that the Entry 8 is indeed correct. The confirmation may be a message transmitted by client device 160 and/or administrator client 165. Based on this confirmation, rule manager 110 may store Entry 8 at in memory 130, in external memory 135, and/or where the initial dataset is stored.

At 340, rule manager 110 may update the rules based on the new input data. In an embodiment, rule manager 110 may analyze other data associated with the initial dataset. For example, Table 4 depicts an embodiment revealing AMOUNT information related to Entries 1-8. The AMOUNT information may represent a payment amount to a BENEFICIARY.

TABLE 3

| ENTRY | BENEFICIARY | PAYMENT_RECIPIENT | BENEFIT | AMOUNT |
|---|---|---|---|---|
| 1 | Warner | Warner | B1 | 100 EUR |
| 2 | Mueller | Mueller | B1 | 110 EUR |
| 3 | Thomas | Thomas | B1 | 120 EUR |
| 4 | Jack | Jack | B1 | 120 EUR |
| 5 | Jack | Thomas | B2 | 200 EUR |
| 6 | Thomas | Peter | B2 | 100 EUR |
| 7 | Peter | Peter | B1 | 110 EUR |
| 8 | Peter | Jack | B1 | 50 EUR |

Based on the updated dataset to include Entry 8, rule manager 110 may generate a new rule so that the entries comply with the rule. For example, rule manager 110 may determine that a BENEFIT should have a "B1" entry when a BENEFICIARY entry equals a PAYMENT_RECIPIENT entry or if the AMOUNT entry is a value less than "100 EUR." In an embodiment, as rule manager 110 adds more confirmed input data to the initial dataset and continues to refine rules, rule manager 110 may build a repository of rules allowing for detection of potentially erroneous data. In an embodiment, rule manager 110 may receive rules from client device 160 and/or administrator client 165. These client device-defined rules may aid in the detection of erroneous input data. For example, after, or simultaneously with, receiving a confirmation that the new input data is correct, rule manager 110 may receive the client device-defined rule. In an embodiment, client device 160 and/or administrator client 165 may transmit the client device-defined and/or administrator client-defined rule to data monitoring system 100. Rule manager 110 may utilize client device-defined and/or administrator client-defined rules at 340 when updating the rules based on the new input data. In an embodiment, rule manager 110 may add client device-defined and/or administrator client-defined rules to other rules generated via an analysis of the updated dataset.

In an embodiment, at 330, after rule manager 110 has generated a noncompliance alert, rule manager 110 may receive an indication that the new input data is not correct. The indication may be a message from client device 160 and/or administrator client 165 instructing rule manager 110 to discard and/or delete the new input data. In this case, rule manager 110 may prompt client device 160 and/or administrator client 165 to provide corrected input data. The corrected input data may be received at 345. In an embodiment, rather than prompting client device 160 and/or administrator client 165 to provide corrected input data, client device 160 and/or administrator client 165 may provide the corrected input data in response to the noncompliance alert. For example, client device 160 and/or administrator client 165 may provide corrected input data as an indication that the new input data was not correct and that rule manager 110 should supplant the incorrect input data with the corrected input data. In an embodiment, when rule manager 110 receives the corrected input data, rule manager 110 may perform 315 to determine if the corrected input data complies with the predetermined rules. In this manner, rule manager 110 may iterate over method 300 until corrected input data that complies with the predetermined rules is found and/or until client device 160 and/or administrator client 165 indicates that the input data is correct.

In an embodiment, method 300 may also be applied to software updates applied on client device 160. Similar to method 200 described with reference to FIG. 2. FIG. 3 may receive each data entry of a dataset and compare each data entry with each entry of an initial dataset stored in memory 130 and/or external memory 135. In this manner, rule manager 110 may confirm that each data entry resulting from a software update is correct.

Figure 4:
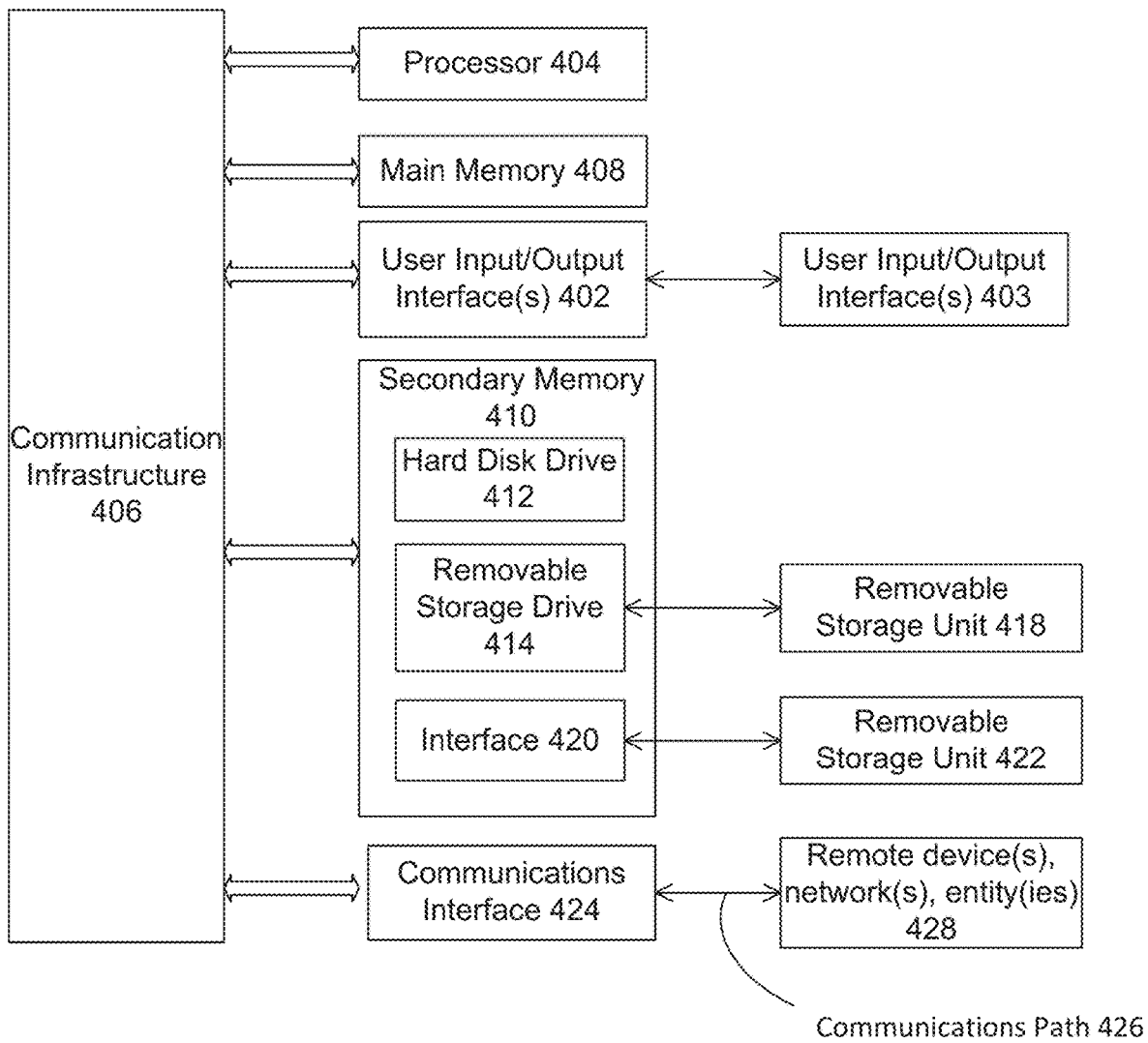
FIG. 4 is an example computer system useful for implementing various embodiments.

Referring now to FIG. 4, various embodiments of can be implemented, for example, using one or more computer systems, such as computer system 400 shown in FIG. 4. One or more computer systems 400 (or portions thereof) can be used, for example, to implement method 200 of FIG. 2 and/or method 300 of FIG. 3.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 4. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
    receiving, by one or more processors at a data monitoring system, an initial dataset, wherein the initial dataset is generated by a first execution of software on a client device, and the initial dataset is known to be correctly generated by the first execution of the software on the client device;
    generating, by the one or more processors, an initial set of rules from the initial dataset;
    receiving, by the one or more processors, a post-update dataset sought to be added to the initial dataset at the data monitoring system, wherein the post-update data set is generated by a second execution of the software on the client device after the software on the client device is updated;
    determining, by the one or more processors, the post-update dataset is different than the initial dataset;
    in response to determining that the post-update data set is different than the initial data set, determining, by the one or more processors, that the post-update dataset is incorrect using the initial set of rules;
    transmitting, by the one or more processors, an alert that the post-update dataset is incorrect to the client device;
    receiving, by the one or more processors, a fixed version of the post-update dataset sought to be added to the initial dataset from the client device in response to transmitting the alert that the post-update dataset is incorrect to the client device;
    receiving, by the one or more processors, a confirmation that the fixed version of the post-update dataset is correct from the client device;
    in response to receiving the confirmation, adding, by the one or more processors, the fixed version of the post-update dataset to the initial dataset for a first time at the data monitoring system, thereby generating an updated dataset; and
    in response to the adding, generating, by the one or more processors, an updated set of rules based on the updated dataset.

2. The computer-implemented method of claim 1, further comprising:
    receiving, by the one or more processors, an input data entry from the client device; and
    transmitting, by the one or more processors, a noncompliance message to the client device indicating that the input data entry does not comply with any rule in the updated set of rules.

3. The computer-implemented method of claim 1, further comprising:
    determining, by the one or more processors, that an input data entry received from the client device complies with a rule in the updated set of rules; and
    adding, by the one or more processors, the input data entry to the updated dataset in response to the determination that the input data entry complies with the rule in the updated set of rules.

4. The computer-implemented method of claim 1, further comprising:
    determining, by the one or more processors, that an input data entry received from the client device does not comply with any rule in the updated set of rules;
    transmitting, by the one or more processors, a noncompliance message to the client device indicating that the input data entry does not comply with any rule in the updated set of rules; and
    discarding, by the one or more processors, the input data entry in response to receiving an indication from the client device that the input data entry is incorrect.

5. The computer-implemented method of claim 4, wherein the indication that the input data entry is incorrect is a receipt of a second input data entry from the client device.

6. The computer-implemented method of claim 1, further comprising:
    receiving, by the one or more processors, an input data entry from the client device;
    determining, by the one or more processors, that the input data entry does not comply with any rule in the updated set of rules;
    receiving, by the one or more processors, a confirmation that the input data entry is correct from the client device;
    adding, by the one or more processors, the input data entry to the updated dataset thereby generating a second updated dataset in response to the receiving the confirmation that the input data entry is correct from the client device;
    generating, by the one or more processors, a new rule based on the second updated dataset; and
    storing, by the one or more processors, the new rule in the updated set of rules, wherein the new rule is configured to be used by the one or more processors to determine whether a second input data entry complies with the new rule.

7. The computer-implemented method of claim 6, wherein the confirmation includes a client device-defined rule.

8. The computer-implemented method of claim 1, wherein the generating further comprises:
   determining, by the one or more processors, a set of patterns from the initial data set;
   selecting, by the one or more processors, a subset of patterns from the set of patterns based on each pattern in the subset of patterns complying with a threshold number of data entries in the initial data set; and
   generating, by the one or more processors, the initial set of rules from the subset of patterns.

9. The computer-implemented method of claim 8, wherein the determining the set of patterns from the initial data set further comprises:
   determining, by the one or more processors, the set of patterns from the initial data set based on each pattern in the set of patterns being less than a threshold number of pattern elements.

10. The computer-implemented method of claim 1, further comprising:
    determining, by the one or more processors, a set of patterns from the initial data set;
    ranking, by the one or more processors, the set of patterns based on a percentage of the initial data set that complies with each respective pattern; and
    wherein the generating further comprises:
      generating, by the one or more processors, the initial set of rules according to the ranked set of patterns.

11. The computer-implemented method of claim 1, further comprising:
    determining, by the one or more processors, that an algorithm implemented by code stored within the updated software on the client device is correct based on an input data entry received from the client device complying with a rule in the updated set of rules.

12. The computer-implemented method of claim 1, wherein each rule in the initial set of rules defines a condition for inclusion of data in the initial dataset.

13. The computer-implemented method of claim 1, wherein the post-update data set is generated by the second execution of the software on the client device after source code of the software on the client device is updated.

14. A data monitoring system, comprising:
    a memory; and
    one or more processors coupled to the memory, the one or more processors configured to:
      receive an initial dataset at the data monitoring system, wherein the initial dataset is generated by a first execution of software on a client device, and the initial dataset is known to be correctly generated by the first execution of the software on the client device;
      generate an initial set of rules from the initial dataset;
      receive a post-update dataset sought to be added to the initial dataset at the data monitoring system, wherein the post-update data set is generated by a second execution of the software on the client device after the software on the client device is updated;
      determine the post-update dataset is different than the initial dataset;
      in response to determining that the post-update data set is different than the initial data set, determine that the post-update dataset is incorrect using the initial set of rules;
      transmit an alert that the post-update dataset is incorrect to the client device;
      receive a fixed version of the post-update dataset sought to be added to the initial dataset from the client device in response to transmitting the alert that the post-update dataset is incorrect to the client device;
      receive a confirmation that the fixed version of the post-update dataset is correct from the client device;
      in response to receiving the confirmation, add the fixed version of the post-update to the initial dataset for a first time at the data monitoring system, thereby generating an updated dataset; and
      in response to the adding, generate an updated set of rules based on the updated dataset.

15. The data monitoring system of claim 14, wherein the one or more processors are further configured to:
    receive an input data entry from the client device; and
    transmit a noncompliance message to the client device indicating that the input data entry does not comply with any rule in the initial set of rules based on the determining the input data entry does not comply with any rule in the initial set of rules.

16. The data monitoring system of claim 14, wherein the one or more processors are further configured to:
    determine that an input data entry received from the client device complies with a rule in the updated set of rules; and
    add the input data entry to the updated dataset in response to the determination that the input data entry complies with the rule in the updated set of rules.

17. The data monitoring system of claim 14, wherein the one or more processors are further configured to:
    determine that an input data entry received from the client device does not comply with any rule in the updated set of rules;
    transmit a noncompliance message to the client device indicating that the input data entry does not comply with any rule in the updated set of rules; and
    discard the input data entry in response to receiving an indication from the client device that the input data entry is incorrect.

18. The data monitoring system of claim 17, wherein the indication that the input data entry is incorrect is a receipt of a second input data entry from the client device at the one or more processors.

19. The data monitoring system of claim 14, wherein the one or more processors are further configured to:
    receive an input data entry from the client device;
    determine that the input data entry does not comply with any rule in the updated set of rules;
    receive a confirmation that the input data entry is correct from the client device;
    add the input data entry to the updated dataset thereby generating a second updated dataset in response to the receiving the confirmation that the input data entry is correct from the client device;
    generate a new rule based on the second updated dataset; and
    store the new rule in the updated set of rules, wherein the new rule is configured to be used by the one or more processors to determine whether a second input data entry complies with the new rule.

20. The data monitoring system of claim 19, wherein the confirmation includes a client device-defined rule.

21. A non-transitory computer-readable medium having instructions stored thereon that, when executed by at least one computing device, cause the at least one computing device to perform operations comprising:
    receiving an initial dataset at the at least one computing device, wherein the initial dataset is generated by a first execution of software on a client device, and the initial dataset is known to be correctly generated by the first execution of the software on the client device;

generating an initial set of rules from the initial dataset;

receiving a post-update dataset sought to be added to the initial dataset at the at least one computing device, wherein the post-update data set is generated by a second execution of the software on the client device after the software on the client device is updated;

determining the post-update dataset is different than the initial dataset;

in response to determining that the post-update data set is different than the initial data set, determining that the post-update dataset is incorrect using the initial set of rules;

transmitting an alert that the post-update dataset is incorrect to the client device;

receiving a fixed version of the post-update dataset sought to be added to the initial dataset from the client device in response to transmitting the alert that the post-update dataset is incorrect to the client device;

receiving a confirmation that the fixed version of the post-update dataset is correct from the client device;

in response to receiving the confirmation, adding the fixed version of the post-update dataset to the initial dataset for a first time at the at least one computing device, thereby generating an updated dataset; and in response to the adding, generating, an updated set of rules based on the updated dataset.

22. The non-transitory computer-readable medium of claim 21, the operations further comprising:

determining that an input data entry received from the client device complies with a rule in the updated set of rules; and adding the input data entry to the updated dataset in response to the determination that the input data entry complies with the rule in the updated set of rules.

23. The non-transitory computer-readable medium of claim 21, the operations further comprising:

determining that an input data entry received from the client device does not comply with any rule in the updated set of rules;

transmitting a noncompliance message to the client device indicating that the input data entry does not comply with any rule in the updated set of rules; and discarding the input data entry in response to receiving an indication from the client device that the input data entry is incorrect.

24. The non-transitory computer-readable medium of claim 23, wherein the indication that the input data entry is incorrect is a receipt of a second input data entry from the client device.

25. The non-transitory computer-readable medium of claim 21, the operations further comprising:

receiving an input data entry from the client device;

determining that the input data entry does not comply with any rule in the updated set of rules;

receiving a confirmation that the input data entry is correct from the client device;

adding the input data entry to the updated dataset thereby generating a second updated dataset in response to the receiving the confirmation that the input data entry is correct from the client device;

generating a new rule based on the second updated dataset; and storing the new rule in the updated set of rules, wherein the new rule is configured to be used by the at least one computing device to determine whether a second input data entry complies with the new rule.

26. The non-transitory computer-readable medium of claim 25, wherein the confirmation includes a client device-defined rule.

* * * * *